US012688318B2

(12) United States Patent
M et al.

(10) Patent No.: US 12,688,318 B2
(45) Date of Patent: Jul. 21, 2026

(54) MANAGEMENT OF SHARED AUTHORIZATION KEYS IN A HYBRID SOFTWARE DEPLOYMENT

(71) Applicant: SAP SE, Walldorf (DE)

(72) Inventors: Sangeetha M, Bangalore (IN); Arpita Jain, Bangalore (IN); Bhagyesh Hede, Bangalore (IN)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 18/429,725

(22) Filed: Feb. 1, 2024

(65) Prior Publication Data

US 2025/0252200 A1 Aug. 7, 2025

(51) Int. Cl.
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

| 11,223,615 | B2 | 1/2022 | Kulkarni | |
| 11,646,884 | B2 | 5/2023 | Mozano | |
| 2017/0177840 | A1* | 6/2017 | Srivastava | G06F 9/4856 |
| 2020/0329041 | A1* | 10/2020 | Mandadi | H04L 63/06 |
| 2022/0353261 | A1* | 11/2022 | Totale | H04L 63/0815 |
| 2023/0046034 | A1 | 2/2023 | Sreeravindra | |
| 2023/0224154 | A1 | 7/2023 | Gopalakrishna et al. | |
| 2023/0283465 | A1 | 9/2023 | Bathula et al. | |
| 2023/0291556 | A1 | 9/2023 | Roth et al. | |
| 2025/0037139 | A1* | 1/2025 | Dimitrov | G06Q 30/018 |

OTHER PUBLICATIONS

"Configure cryptographic key auto-rotation in Azure Key Vault", Microsoft Learn, (Jul. 26, 2023), 16 pgs.

* cited by examiner

*Primary Examiner* — Joshua Joo
(74) *Attorney, Agent, or Firm* — SCHWEGMAN LUNDBERG & WOESSNER, P.A.

(57) ABSTRACT

In an example embodiment, a solution is provided that performs the rotation of access keys of cloud components that are shared in on-premise software components (such as in a hybrid deployment environment) such that a minimal number of keys are needed. The solution also provides for having a specified validity of the access key, so that the hybrid or on-premise components can retain access to the software components while the new access keys are being generated.

20 Claims, 6 Drawing Sheets

Figure 2:
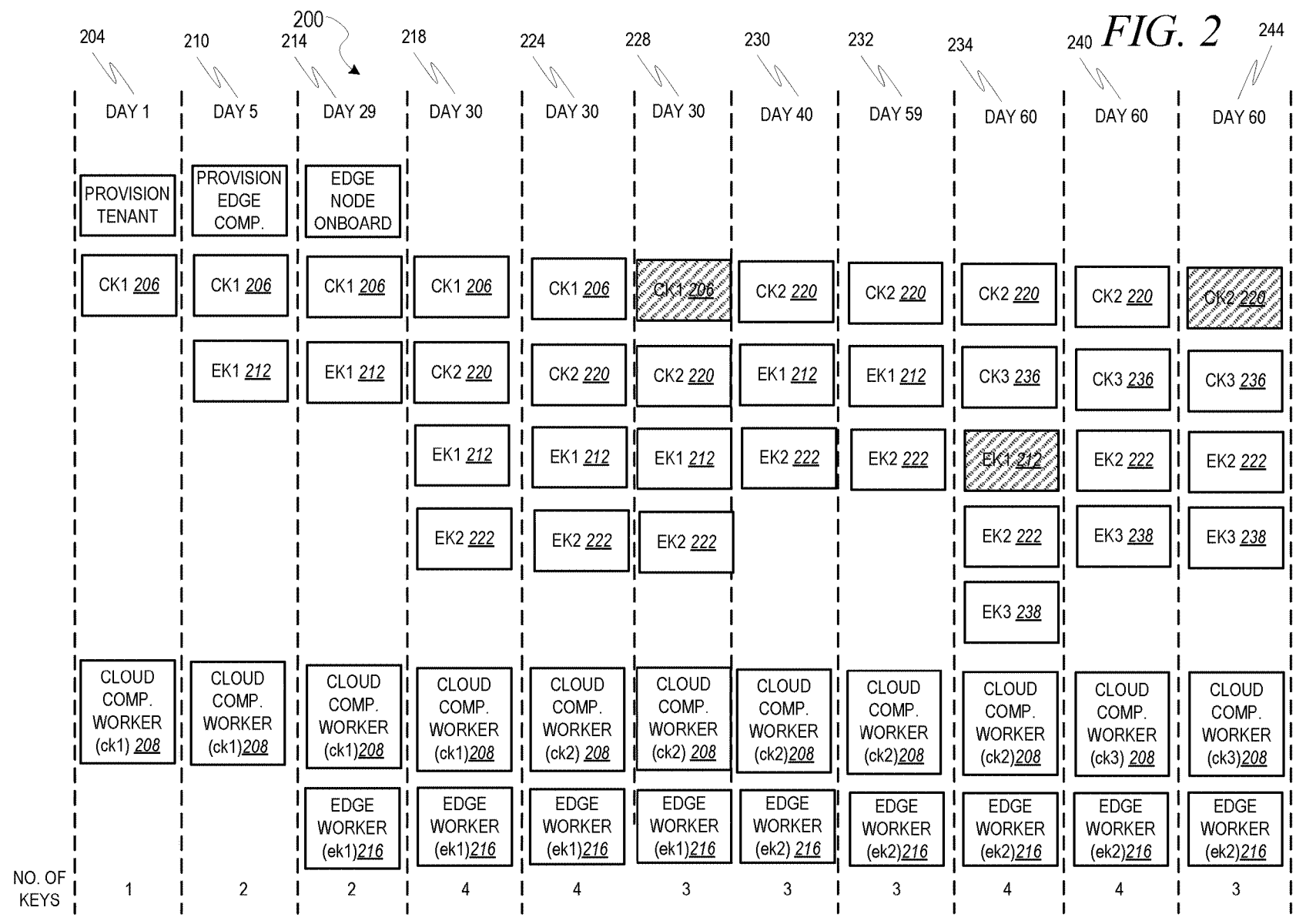

| | DAY 1 (204) | DAY 5 (210) | DAY 29 (214) | DAY 30 (218) | DAY 30 (224) | DAY 30 (228) | DAY 40 (230) | DAY 59 (232) | DAY 60 (234) | DAY 60 (240) | DAY 60 (244) |
|---|---|---|---|---|---|---|---|---|---|---|---|
| Action | PROVISION TENANT | PROVISION EDGE COMP. | EDGE NODE ONBOARD | | | | | | | | |
| CK | CK1 206 | CK1 206 | CK1 206 | CK1 206 | CK1 206 | CK1 206 | CK2 220 | CK2 220 | CK2 220 | CK2 220 | CK2 220 |
| | | | | CK2 220 | CK2 220 | CK2 220 | | | CK3 236 | CK3 236 | CK3 236 |
| EK | | EK1 212 | EK1 212 | EK1 212 | EK1 212 | EK1 212 | EK1 212 | EK1 212 | EK1 212 | EK2 222 | EK2 222 |
| | | | | EK2 222 | EK2 222 | EK2 222 | EK2 222 | EK2 222 | EK2 222 | EK3 238 | EK3 238 |
| | | | | | | | | | EK3 238 | | |
| Cloud Comp. Worker | CLOUD COMP. WORKER (ck1) 208 | CLOUD COMP. WORKER (ck1) 208 | CLOUD COMP. WORKER (ck1) 208 | CLOUD COMP. WORKER (ck1) 208 | CLOUD COMP. WORKER (ck2) 208 | CLOUD COMP. WORKER (ck2) 208 | CLOUD COMP. WORKER (ck2) 208 | CLOUD COMP. WORKER (ck2) 208 | CLOUD COMP. WORKER (ck2) 208 | CLOUD COMP. WORKER (ck3) 208 | CLOUD COMP. WORKER (ck3) 208 |
| Edge Worker | | | EDGE WORKER (ek1) 216 | EDGE WORKER (ek1) 216 | EDGE WORKER (ek1) 216 | EDGE WORKER (ek1) 216 | EDGE WORKER (ek2) 216 | EDGE WORKER (ek2) 216 | EDGE WORKER (ek2) 216 | EDGE WORKER (ek2) 216 | EDGE WORKER (ek2) 216 |
| NO. OF KEYS | 1 | 2 | 2 | 4 | 4 | 3 | 3 | 3 | 4 | 4 | 3 |

MANAGEMENT OF SHARED AUTHORIZATION KEYS IN A HYBRID SOFTWARE DEPLOYMENT

TECHNICAL FIELD

This document generally relates to computer security. More specifically, this document relates to the management of shared authorization keys in a hybrid software environment.

BACKGROUND

The increasing movement towards moving applications to the cloud has created new security risks. While multi-tenant cloud environments are supposed to provide secure access to applications for a number of different tenants simultaneously, it can be difficult to properly manage access in a secure and efficient manner.

BRIEF DESCRIPTION OF DRAWINGS

The present disclosure is illustrated by way of example and not limitation in the figures of the accompanying drawings, in which like references indicate similar elements.

FIG. 2 is a timeline depicting an example of key rotation, in accordance with an example embodiment.

DETAILED DESCRIPTION

Figure 1:
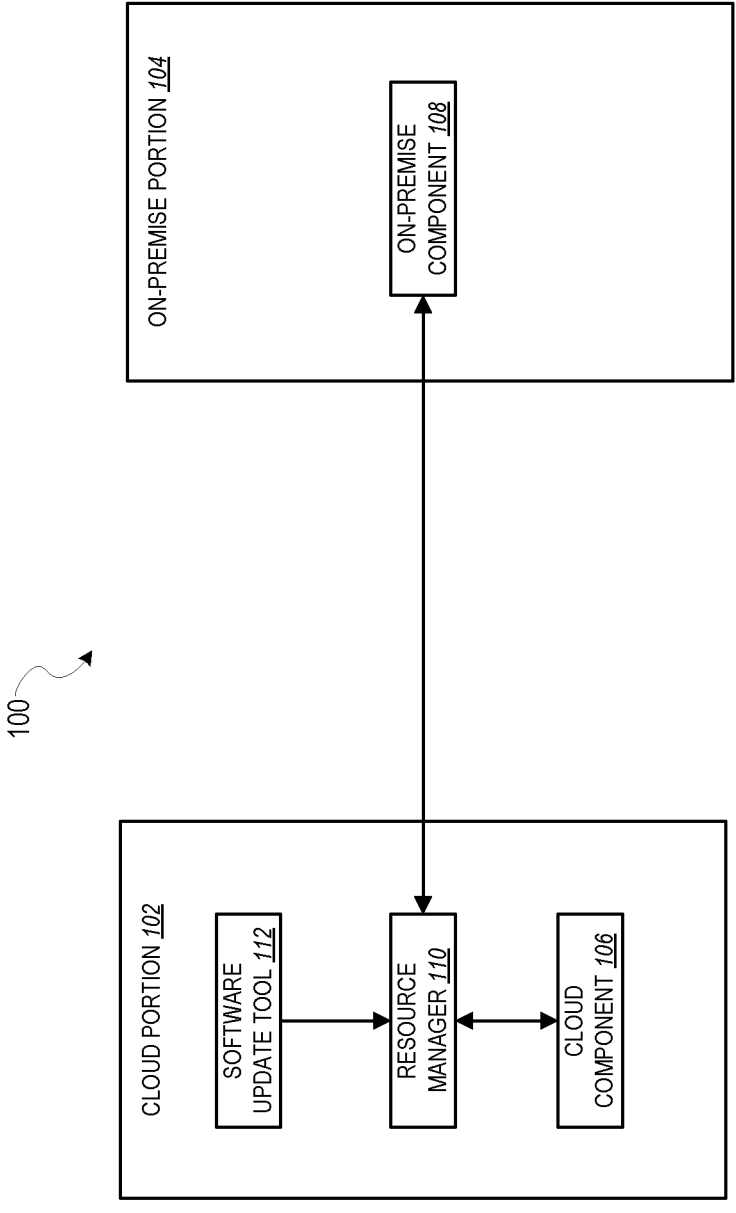
FIG. 1 is a block diagram illustrating a system for hybrid deployment of a software application, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Companies may select either to run an application fully on-premise or fully on a cloud platform. However, there are advantages and disadvantages with both cloud and on-premise platforms. Issues related to security and compliance of cloud platforms may be one disadvantage. On the other hand, the cost may be a disadvantage for on-premise platforms. Since the initial investment in on-premise infrastructure may be high, companies that have already invested in on-premise platforms may prefer gradual adoption of cloud platforms, if at all, in order to maximize return and protect their initial investments. Therefore, a hybrid software delivery model may bring more value to such companies. The hybrid delivery model is a hybrid model between on-premise and cloud, i.e., on-demand. For example, in the case where an application operates on an on-premise platform with sensitive data, such data may be undesirable to be stored on a cloud platform and accessed via the Internet. In such a case, a hybrid software delivery may be used where cloud services can be consumed by applications operating on an on-premise platform. Another situation where hybrid software delivery model may be appropriate is when companies prefer to run their existing on-premise applications on a cloud platform. For example, business applications running and operating on-premise at one point may be extended or migrated towards a cloud platform, for example, to consume functionality and modern development environment and models provided by the cloud platform. However, to enable an application operating on-premise to operate on cloud, the company may have to incur costs comparable to develop a new application resulting in worse protection for on-premise investments. Also, when an application is migrated to the cloud platform, two versions of the application may have to be maintained for the on-premise and the cloud platform, increasing maintenance costs for the application.

Companies applying either on-premise or cloud software delivery models may have to balance between security and costs. In one embodiment, a hybrid delivery model is implemented that enables one or more applications to be deployed to both on-premise and cloud platforms without modifying the one or more applications. An application operable to be deployed and run on both on-premise and cloud platforms, without modification of the original source code of the application, is referred herein as a hybrid application. For example, a hybrid application may be deployed and/or run on an on-premise platform, and consume services or other resources provided by a cloud platform (e.g., public or virtual private cloud). Further, a hybrid application may be deployed and/or run on a cloud platform and consume resources of an on-premise platform such as a backend system.

One mechanism that can be used to help ensure security in a hybrid application environment is to rotate authorization access keys of each software component in an application at some regular interval. This helps to ensure that the new keys supersede the old ones if the keys are breached, and access to the software components using the old keys is revoked, thereby reducing the impact of any breach.

The software components being protected via this key rotation mechanism are databases, object stores, software functions, and so forth. Each of these components are accessible via individual access keys. In a hybrid deployment model, parts of the software are deployed on the cloud and parts are deployed on-premise. At times, the components in the cloud need to be accessed by the components deployed on-premise. In such scenarios, access keys of the cloud software component are shared with the private cloud or on-premise.

The cloud components, however, have limits on the number of access keys that can exist at a time. For example, many components have a limit of five keys in operation at a time. The credentials that are shared on-premise need to be distinct from the ones used on the cloud in order to identify the principal user using the software component. Thus, a technical problem is encountered in that the number of keys that are needed to be active with the security constraint of having the ability of being rotated will dramatically increase, causing a conflict with the need to rotate keys versus the number of keys available to be active at any one time.

In an example embodiment, a solution is provided that performs the rotation of access keys of cloud components that are shared in on-premise software components (such as in a hybrid deployment environment) such that a minimal number of keys are needed. The solution also provides for having a specified validity of the access key, so that the hybrid or on-premise components can retain access to the software components while the new access keys are being generated.

More particularly, new access keys are created for both cloud and on-premise for any provisioned tenant on periodic basis with the release of new software version. For purposes of discussion in this disclosure, a period of 30 days will be described as the software update cycle, but this shall not be taken as limiting in any way and one of ordinary skill in the art will recognize that any time frame can be used for the period.

Keys are first created when needed (e.g., when a tenant is provisioned and on-premise capability is provisioned), but every 30 days, a sequence of actions is performed to accomplish key rotation, in accordance with an example embodiment. First, it is checked if there are more than one on-premise key in operation. If so, the oldest on-premise key is picked for deletion. After this, new cloud and on-premise key is created for any key in operation. Any needed updates to the component(s) involved can then be performed. Following those updates, the newly created cloud key will now be in operation and hence the oldest cloud key will be picked for deletion.

Thus, this key rotation solution uses only a maximum of 4 keys at a time for each tenant/component combination, which is well within the maximum limits of most software components.

FIG. 1 is a block diagram illustrating a system 100 for hybrid deployment of a software application, in accordance with an example embodiment. As described earlier, the system 100 includes a cloud portion 102 and an on-premise portion 104. The cloud portion 102 comprises one or more servers that are accessed by multiple tenants over the Internet, or another large network. The on-premise portion 104 runs at a location operated by one of the tenants. While pictured here is a single on-premise portion 104, in actuality there may be any number of on-premises portions 104 associated with the different tenants able to access the cloud portion 102.

Because this is a hybrid deployment scenario, a single application can comprise both a cloud component 106 and an on-premise component 108. While a single cloud component 106 and a single on-premise component 108 are depicted here, an application may actually comprise any number of cloud components 106 and on-premise components 108.

A resource manager 110 manages the keys involved in accessing the on-premise component 108 and the cloud component 106. When a tenant is provisioned, the cloud component 106 is created and the cloud key is created for accessing this component. After this, when on-premise portion is activated, the on-premise component 108 is created or at least instantiated, and the resource manager 110 creates an on-premise key, which it then sends to the on-premise component 108. The on-premise component 108 uses this on-premise key to access the cloud component 106. Thus, for example, any time the on-premise component 108 wishes to request data or perform any other interaction with the cloud component 106, the on-premise component 108 includes the on-premise key in a communication, and the resource manager 110 authorizes access after validating the on-premise key. The on-premise key allows the on-premise component 108 to access a specific cloud component, such as cloud component 106 (and not other cloud components in the cloud portion 102), making it a limited authorization key.

Every 30 days, a software update tool 112 acts to update the cloud component 106. First, however, it initiates a credential rotation at the resource manager 110. Specifically, the resource manager 110 first checks if there are more than one on-premise key in operation. If in such case, the oldest on-premise key is picked for deletion. It then creates a new cloud key and a new on-premise key. Then the software update tool 112 can act to actually update the cloud component 106. Following this, the new cloud key is now in operation and hence the oldest cloud key is deleted.

FIG. 2 is a timeline 200 depicting an example of key rotation in accordance with an example embodiment. Here, a software component is running on version n. At day one 204, a tenant is provisioned, including creating cloud key ck1 206. Also created is cloud component worker 208, which is accessed via cloud key ck1 206.

At any time before the next software update (between day one and day thirty), example day five 210, the edge component 212 is provisioned and edge key ek1 212 is created on cloud. Here, edge key is another name for an on-premise key.

At any time before the next software update (between day one and day thirty), example day twenty-nine 214, an edge node is onboarded, which causes edge worker 216 to be created and edge key ek1 212 will be propagated to edge worker 216. Edge worker 216 will use this edge key ek1 212 to access the cloud component.

Here, the fixed time for software update cycle is 30 days. As will be seen, typically at each key rotation cycle the oldest version of the edge key is deleted when there are more than one on-premise key. For the first cycle, however, edge key ek1 212 is not deleted because it has not been in existence for a complete cycle yet and this is the only on-premise key existing at this stage and there is no on-premise key eligible for deletion. Then new versions of the cloud key ck1 206 and edge key ek1 212, namely cloud key ck2 220 and edge key ek2 222, respectively, are created.

Following this, at a later time on day thirty 224, the cloud component worker 208 is updated. This also causes the software component to run on version n+1 instead of n. Following this, at a later time on day thirty 228, the oldest cloud key, namely ck1 206, is deleted.

At day forty 230, the tenant performs an edge update, which then begins to utilize edge key ek2 222 instead of edge key ek1 212. This edge update can be performed at any point of time between day thirty one to day fifty nine (e.g. Another edge update can be performed at day fifty nine 232.)

At day sixty 234, the key rotation process runs again with a software update. At this time, there is more than one on-premise key and hence the oldest edge key, namely ek1 212 is deleted. New cloud key ck3 236 and new edge key ek3 238 are created. Following this, at a later time on day sixty 240, the cloud component worker 208 is updated. This also causes the software component to run on version n+2 instead of n+1. Following this, at a later time on day sixty 244, the oldest cloud key, namely cloud key ck2 220, is deleted.

The result is that the proposed solution is able to manage the authorization keys for both the cloud and on-premise components, using a maximum of 4 keys for key rotation.

The customer continues to get software operation continuity with the previous version of the software. This is because at any time there will be two on-premise access keys which are created 30 days apart. Since the period (30 days) can be selected to be equal to the difference between release dates of version updates, the customer will not have any continuity loss in operation of the application.

The system administrator of on-premise agents are the ones usually applying the new authorization keys to the software of the hybrid applications. In other words, this is typically initiated manually. However, as the number of on-premise components increase, the manual process of keeping the authorization keys updated for all such agents becomes cumbersome. In an example embodiment, to ensure that the security procedures are applied without any manual overhead, an edge agent is added to the on-premise portion of the software application. The edge agent initiates a time-triggered job that executes as a pre-defined interval. The edge agent has specific limited authorization to call a refresh hook Application Programming Interface (API) on the cloud portion to initiate the key rotation process. Then the cloud portion checks the appropriate authorization access of the on-premise agent and returns the pre-generated credentials. The on-premise agent then applies the new authorization keys to the edge deployment. The success or failure of the application of the new keys is then communicated back to the cloud portion. This embodiment is depicted in FIG. 3

Figure 3:
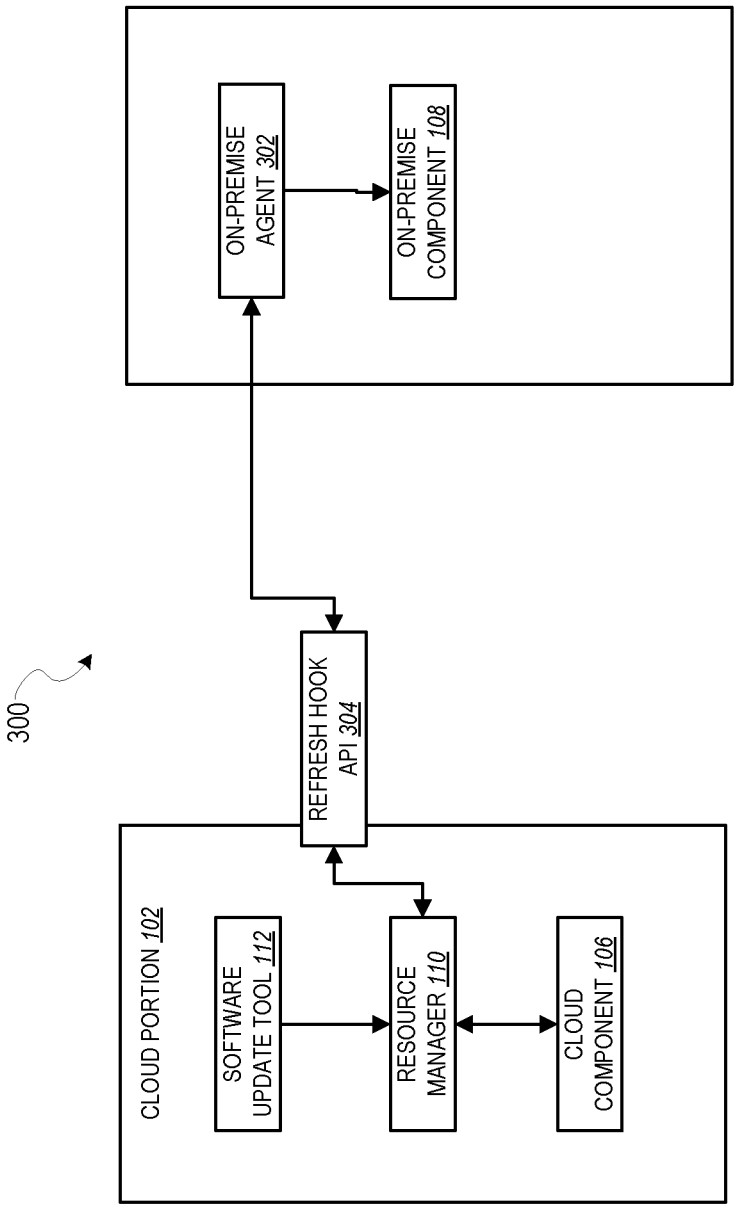
FIG. 3 is a block diagram illustrating a system for hybrid deployment of a software application, in accordance with another example embodiment.

FIG. 3 is a block diagram illustrating a system 300 for hybrid deployment of a software application, in accordance with another example embodiment. Here, the system is identical to that of FIG. 1, with the exception of the addition of the on-premise agent 302, which calls the refresh hook API 304 on the resource manager 110 to initiate the key rotation process.

Figure 4:
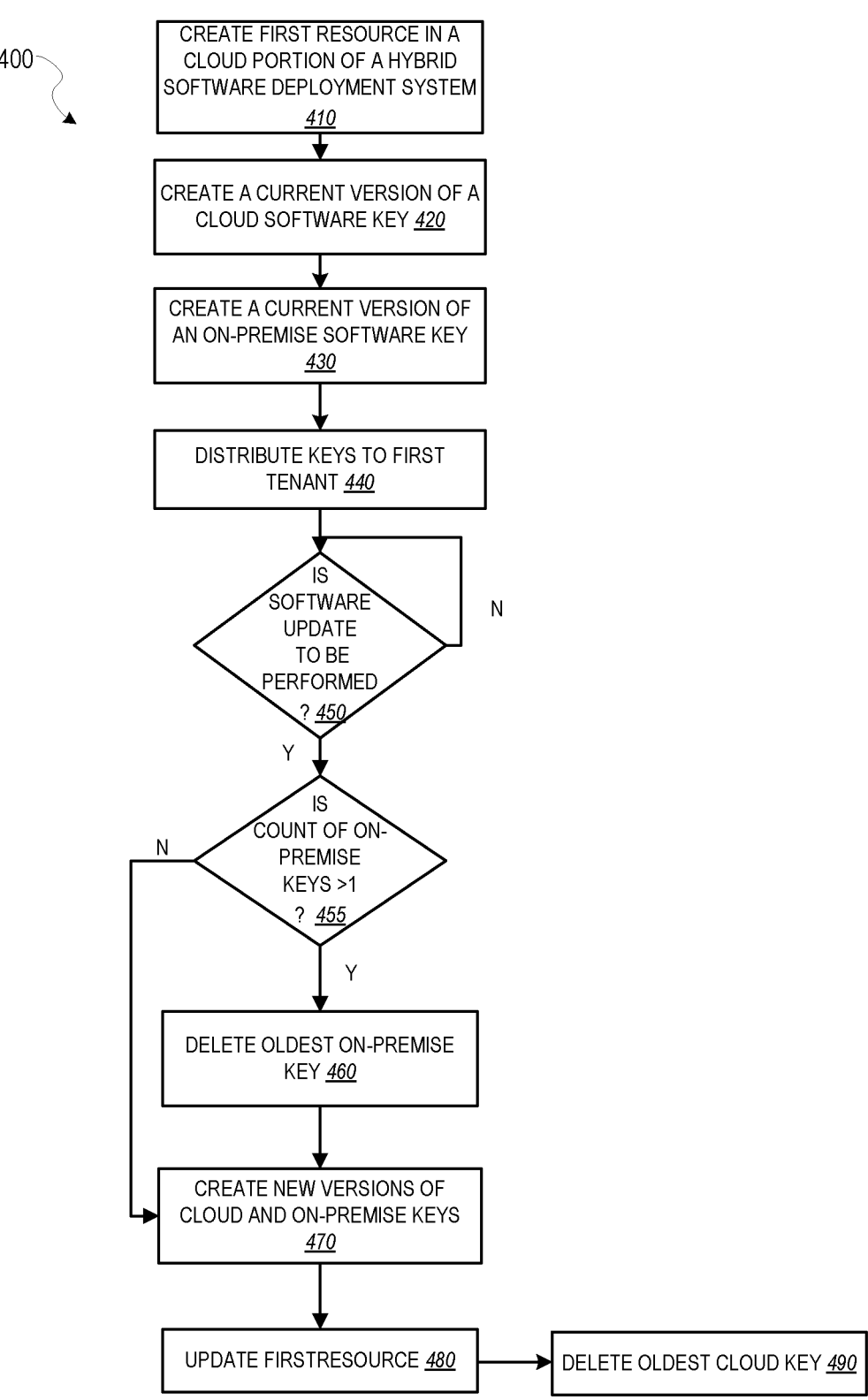
FIG. 4 is a flow diagram illustrating a method of key rotation in a hybrid software deployment system, in accordance with an example embodiment.

FIG. 4 is a flow diagram illustrating a method 400 of key rotation in a hybrid software deployment system, in accordance with an example embodiment. At operation 410, a first resource in a cloud portion of a hybrid software deployment system comprising the cloud portion and an on-premise portion is created. At operation 420, a current version of a cloud software key for access to the first resource is created. At operation 430, a current version of an on-premise software key for the on-premise component on the on-premise portion is created which will be used to access the cloud component. At operation 440, the current version of the cloud software key and the current version of the on-premise software key are distributed to a first tenant of the hybrid software component. It should be noted that while FIG. 4 depicts this distribution happening in all one operation, one of ordinary skill in the art will recognize that the distribution of the current version of the cloud software key can occur in a separate operation than the distribution of the current version of the on-premise key, and these operations can be performed at any time.

A series of operations are then performed on a periodic basis. As such, at operation 450, it is determined if software update to be performed which happens at a fixed time duration. If so, then at operation 455, it is determined if the count of on-premise keys is greater than one. If so, then at operation 460, the oldest on-premise key is deleted. Then, or if the count of on-premise keys was not greater than one, at operation 470, a new version of the cloud software key and a new version of the on-premise software key are created. Again, while both these things are depicted as occurring in a single operation, in some example embodiments it may be split into multiple operations.

At operation 480, the first resource in the cloud portion is updated. Then at operation 490, the oldest cloud key is deleted. The method 400 may then loop back to operation 450.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: creating a first resource in a cloud portion of a hybrid software deployment system comprising the cloud portion and an on-premise portion; creating a current version of a cloud software key for access to the first resource; creating a current version of an on-premise software key for the on-premise component on the on-premise portion to access the cloud component; distributing the current version of the cloud software key and the current version of the on-premise software key to a first tenant of the hybrid software component; and periodically performing, at a time period of a fixed duration, operations comprising: deleting the oldest version of the on-premise software key when there are more than one on-premise key; creating a new version of the cloud software key and a new version of the on-premise software key; updating the first resource in the cloud portion; and deleting the oldest version of the cloud software key.

In Example 2, the subject matter of Example 1 includes, wherein the first resource is a database.

In Example 3, the subject matter of Examples 1-2 includes, wherein the operations further comprise distributing the new version of the cloud software key and the new version of the on-premise software key to the first tenant.

In Example 4, the subject matter of Example 3 includes, wherein the operations further comprise: creating a current version of a cloud software key for access to the first resource; creating a second current version of the on-premise software key for the on-premise component on the on-premise portion to access the cloud component; distributing the current version of the cloud software key and the second current version of the on-premise software key to a second tenant of the hybrid software component; and periodically performing, at the time period of a fixed duration, operations comprising: deleting the oldest second version of the on-premise software key when there are more than one on-premise key; creating a new version of the cloud software key and a new second version of the on-premise software key; updating the first resource in the cloud portion; and deleting the oldest version of the cloud software key.

In Example 5, the subject matter of Examples 1~4 includes, wherein the operations are performed in response to actions comprising: receiving a call to initiate a key rotation process via a refresh hook API from an agent on the on-premise portion; and in response to the receiving of the call, checking authorization access of the agent.

In Example 6, the subject matter of Examples 1-5 includes, wherein the first resource has a maximum limit for a number of keys in operation at any one time.

In Example 7, the subject matter of Examples 1-6 includes, wherein the fixed duration is selected based on an update schedule for the first resource.

Example 8 is a method comprising: creating a first resource in a cloud portion of a hybrid software deployment system comprising the cloud portion and an on-premise portion; creating a current version of a cloud software key for access to the first resource; creating a current version of an on-premise software key for the on-premise component on the on-premise portion to access the cloud component; distributing the current version of the cloud software key and the current version of the on-premise software key to a first tenant of the hybrid software component; and periodically performing, at a time period of a fixed duration, operations comprising: deleting the oldest version of the on-premise software key when there are more than one on-premise key; creating a new version of the cloud software key and a new version of the on-premise software key; updating the first resource in the cloud portion; and deleting the oldest version of the cloud software key.

In Example 9, the subject matter of Example 8 includes, wherein the first resource is a database.

In Example 10, the subject matter of Examples 8-9 includes, distributing the new version of the cloud software key and the new version of the on-premise software key to the first tenant.

In Example 11, the subject matter of Example 10 includes, creating a current version of a cloud software key for access to the first resource; creating a second current version of the on-premise software key for the on-premise component on the on-premise portion to access the cloud component; distributing the current version of the cloud software key and the second current version of the on-premise software key to a second tenant of the hybrid software component; and periodically performing, at the time period of a fixed duration, operations comprising: deleting the oldest second version of the on-premise software key when there are more than one on-premise key; creating a new version of the cloud software key and a new second version of the on-premise software key; updating the first resource in the cloud portion; and deleting the oldest version of the cloud software key. In Example 12, the subject matter of Example 11 includes, wherein the method is performed in response to actions comprising: receiving a call to initiate a key rotation process via a refresh hook API from an agent on the on-premise portion; and in response to the receiving of the call, checking authorization access of the agent.

In Example 13, the subject matter of Examples 8-12 includes, wherein the first resource has a maximum limit for a number of keys in operation at any one time.

In Example 14, the subject matter of Examples 8-13 includes, wherein the fixed duration is selected based on an update schedule for the first resource.

Example 15 is a non-transitory machine-readable medium storing instructions which, when executed by one or more processors, cause the one or more processors to perform operations comprising: creating a first resource in a cloud portion of a hybrid software deployment system comprising the cloud portion and an on-premise portion; creating a current version of a cloud software key for access to the first resource; creating a current version of an on-premise software key for the on-premise component on the on-premise portion to access the cloud component; distributing the current version of the cloud software key and the current version of the on-premise software key to a first tenant of the hybrid software component; and periodically performing, at a time period of a fixed duration, operations comprising: deleting the oldest version of the on-premise software key when there are more than one on-premise key; creating a new version of the cloud software key and a new version of the on-premise software key; updating the first resource in the cloud portion; and deleting the oldest version of the cloud software key.

In Example 16, the subject matter of Example 15 includes, wherein the first resource is a database.

In Example 17, the subject matter of Examples 15-16 includes, wherein the operations further comprise distributing the new version of the cloud software key and the new version of the on-premise software key to the first tenant.

In Example 18, the subject matter of Example 17 includes, wherein the operations further comprise: creating a current version of a cloud software key for access to the first resource; creating a second current version of the on-premise software key for the on-premise component on the on-premise portion to access the cloud component; distributing the current version of the cloud software key and the second current version of the on-premise software key to a second tenant of the hybrid software component; and periodically performing, at the time period of a fixed duration, operations comprising: deleting the oldest second version of the on-premise software key when there are more than one on-premise key; creating a new version of the cloud software key and a new second version of the on-premise software key; updating the first resource in the cloud portion; and deleting the oldest version of the cloud software key.

In Example 19, the subject matter of Examples 15-18 includes, wherein the operations are performed in response to actions comprising: receiving a call to initiate a key rotation process via a refresh hook API from an agent on the on-premise portion; and in response to the receiving of the call, checking authorization access of the agent.

In Example 20, the subject matter of Examples 15-19 includes, wherein the first resource has a maximum limit for a number of keys in operation at any one time.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Figure 5:
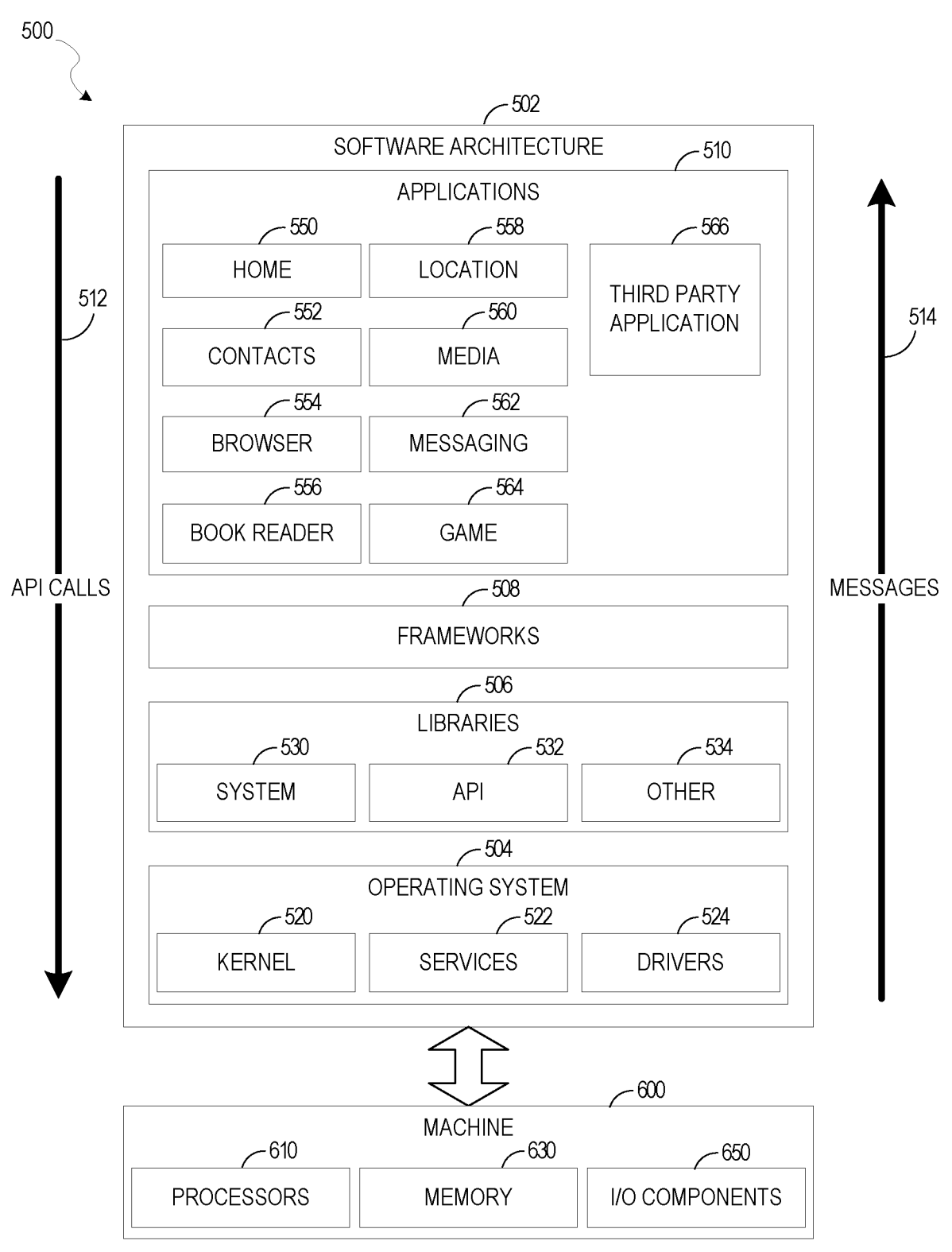
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
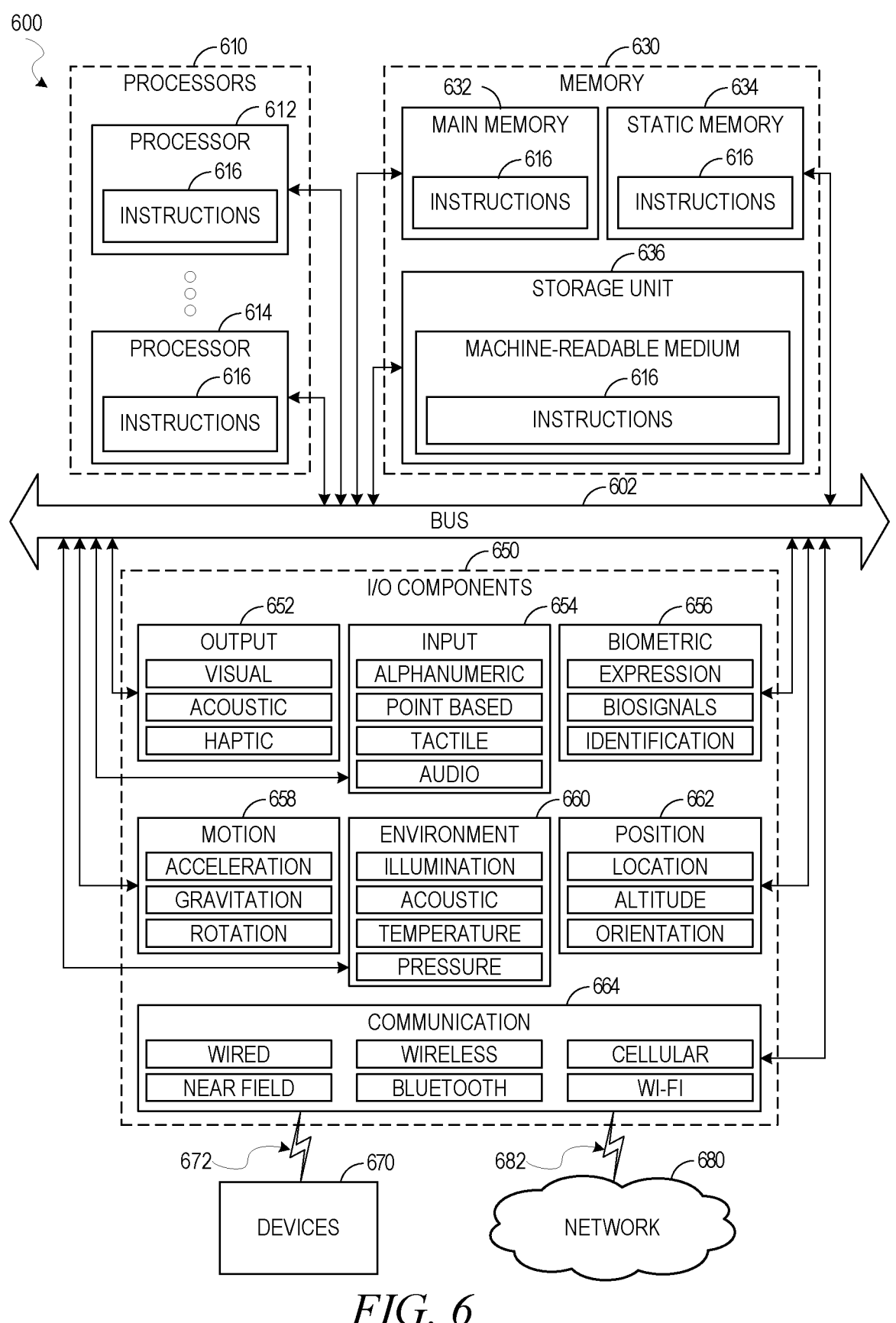
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 3. Additionally, or alternatively, the instructions 616 may implement FIGS. 1-3 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A system comprising:
at least one hardware processor; and
a computer-readable medium storing instructions that, when executed by the at least one hardware processor, cause the at least one hardware processor to perform operations comprising:

creating a first resource in a cloud portion of a hybrid software deployment system, the hybrid software deployment system comprising the cloud portion and an on-premise portion;

creating a current version of a cloud software key for access to the first resource;

creating a current version of an on-premise software key on behalf of an on-premise component on the on-premise portion, to allow the on-premise component to access a cloud component on the cloud portion;

distributing the current version of the cloud software key and the current version of the on-premise software key to a first tenant of the hybrid software deployment system; and periodically performing, at a time period of a fixed duration, operations comprising:

deleting an oldest version of the on-premise software key when there are more than one on-premise keys;

creating a new version of the cloud software key and a new version of the on-premise software key;

updating the first resource in the cloud portion; and deleting an oldest version of the cloud software key.

2. The system of claim 1, wherein the first resource is a database.

3. The system of claim 1, wherein the operations further comprise distributing the new version of the cloud software key and the new version of the on-premise software key to the first tenant.

4. The system of claim 3, wherein the operations further comprise:

creating a current version of a cloud software key for access to the first resource;

creating a second current version of the on-premise software key for a second on-premise portion to access the cloud portion;

distributing the current version of the cloud software key and the second current version of the on-premise software key to a second tenant of the hybrid software deployment system; and periodically performing, at the time period of a fixed duration, operations comprising:

deleting the oldest second version of the on-premise software key when there are more than one on-premise key;

creating a new version of the cloud software key and a new second version of the on-premise software key;

updating the first resource in the cloud portion; and deleting the oldest version of the cloud software key.

5. The system of claim 1, wherein the operations are performed in response to actions comprising:

receiving a call to initiate a key rotation process via a refresh hook Application Programming Interface (API) from an agent on the on-premise portion; and in response to the receiving of the call, checking authorization access of the agent.

6. The system of claim 1, wherein the first resource has a maximum limit for a number of keys in operation at any one time.

7. The system of claim 1, wherein the fixed duration is selected based on an update schedule for the first resource.

8. A method comprising:

creating a first resource in a cloud portion of a hybrid software deployment system comprising the cloud portion and an on-premise portion;

creating a current version of a cloud software key for access to the first resource;

creating a current version of an on-premise software key for the on-premise portion to access the cloud portion;

distributing the current version of the cloud software key and the current version of the on-premise software key to a first tenant of the hybrid software deployment system; and periodically performing, at a time period of a fixed duration, operations comprising:

deleting an oldest version of the on-premise software key when there are more than one on-premise key;

creating a new version of the cloud software key and a new version of the on-premise software key;

updating the first resource in the cloud portion; and deleting an oldest version of the cloud software key.

9. The method of claim 8, wherein the first resource is a database.

10. The method of claim 8, further comprising distributing the new version of the cloud software key and the new version of the on-premise software key to the first tenant.

11. The method of claim 10, further comprising:

deleting the oldest second version of the on-premise software key when there are more than one on-premise key;

creating a new version of the cloud software key and a new second version of the on-premise software key;

updating the first resource in the cloud portion; and deleting the oldest version of the cloud software key.

12. The method of claim 11, wherein the method is performed in response to actions, comprising:

receiving a call to initiate a key rotation process via a refresh hook Application Programming Interface (API) from an agent on the on-premise portion; and in response to the receiving of the call, checking authorization access of the agent.

13. The method of claim 8, wherein the first resource has a maximum limit for a number of keys in operation at any one time.

14. The method of claim 8, wherein the fixed duration is selected based on an update schedule for the first resource.

15. A non-transitory machine-readable medium storing instructions which, when executed by one or more processors, cause the one or more processors to perform operations comprising:

creating a first resource in a cloud portion of a hybrid software deployment system comprising the cloud portion and an on-premise portion;

creating a current version of a cloud software key for access to the first resource;

creating a current version of an on-premise software key for the on-premise portion to access the cloud portion;

distributing the current version of the cloud software key and the current version of the on-premise software key to a first tenant of the hybrid software deployment system; and periodically performing, at a time period of a fixed duration, operations comprising:

deleting an oldest version of the on-premise software key when there are more than one on-premise key;

creating a new version of the cloud software key and a new version of the on-premise software key;

updating the first resource in the cloud portion; and deleting an oldest version of the cloud software key.

16. The non-transitory machine-readable medium of claim 15, wherein the first resource is a database.

17. The non-transitory machine-readable medium of claim 15, wherein the operations further comprise distributing the new version of the cloud software key and the new version of the on-premise software key to the first tenant.

18. The non-transitory machine-readable medium of claim 17, wherein the operations further comprise:

creating a current version of a cloud software key for access to the first resource;

creating a second current version of the on-premise software key for a second on-premise portion to access the cloud portion;

distributing the current version of the cloud software key and the second current version of the on-premise software key to a second tenant of the hybrid software deployment system; and periodically performing, at the time period of a fixed duration, operations comprising:

deleting an oldest second version of the on-premise software key when there are more than one on-premise key;

creating a new version of the cloud software key and a new second version of the on-premise software key;

updating the first resource in the cloud portion; and deleting an oldest version of the cloud software key.

19. The non-transitory machine-readable medium of claim 15, wherein the operations are performed in response to actions, comprising:

receiving a call to initiate a key rotation process via a refresh hook Application Programming Interface (API) from an agent on the on-premise portion; and in response to the receiving of the call, checking authorization access of the agent.

20. The non-transitory machine-readable medium of claim 15, wherein the first resource has a maximum limit for a number of keys in operation at any one time.

* * * * *